Feb. 20, 1951        J. L. EWING         2,542,127
                      RESET VALVE
Filed July 31, 1944                  2 Sheets-Sheet 1
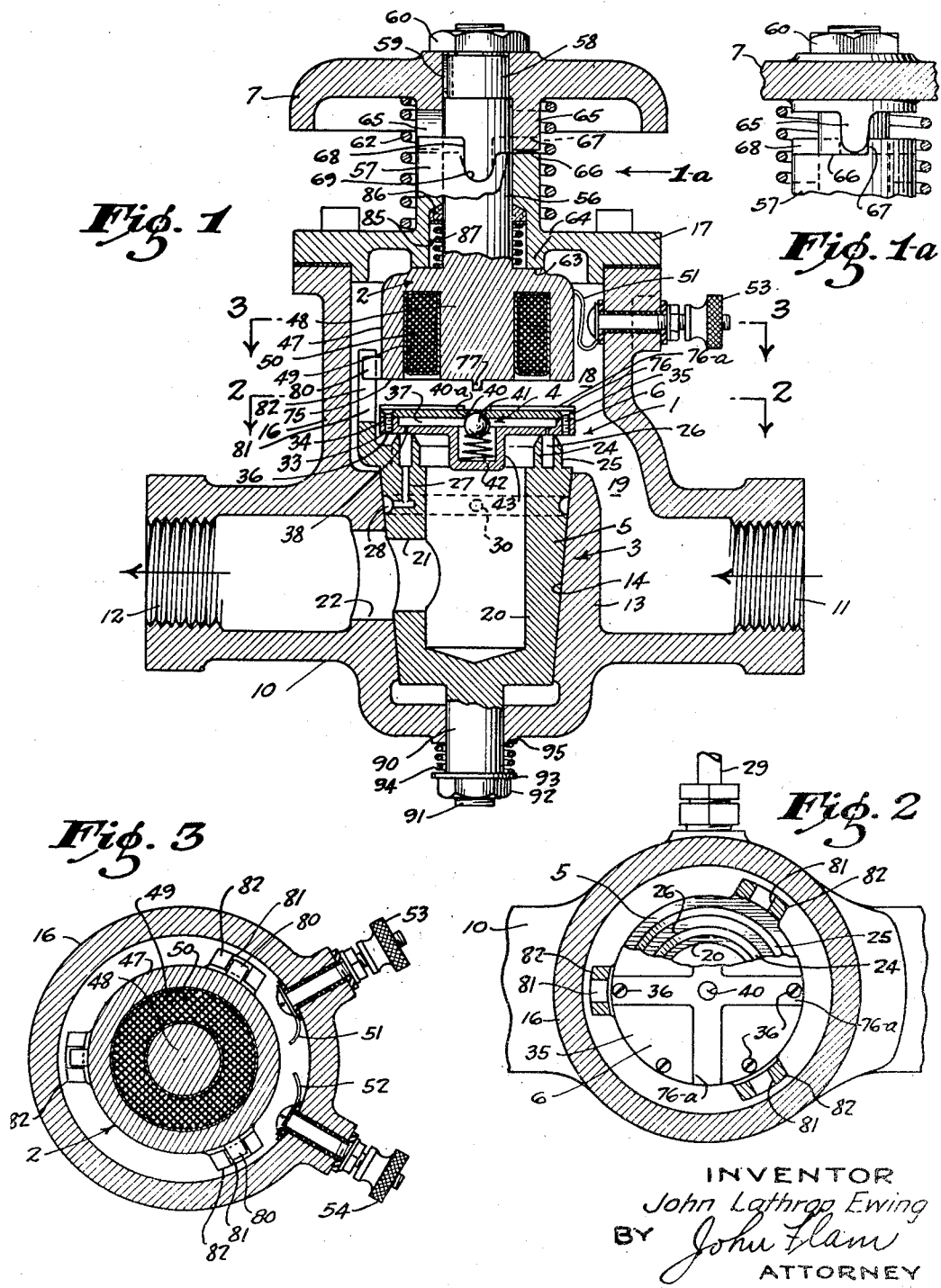
INVENTOR
John Lathrop Ewing
BY John Flam
ATTORNEY

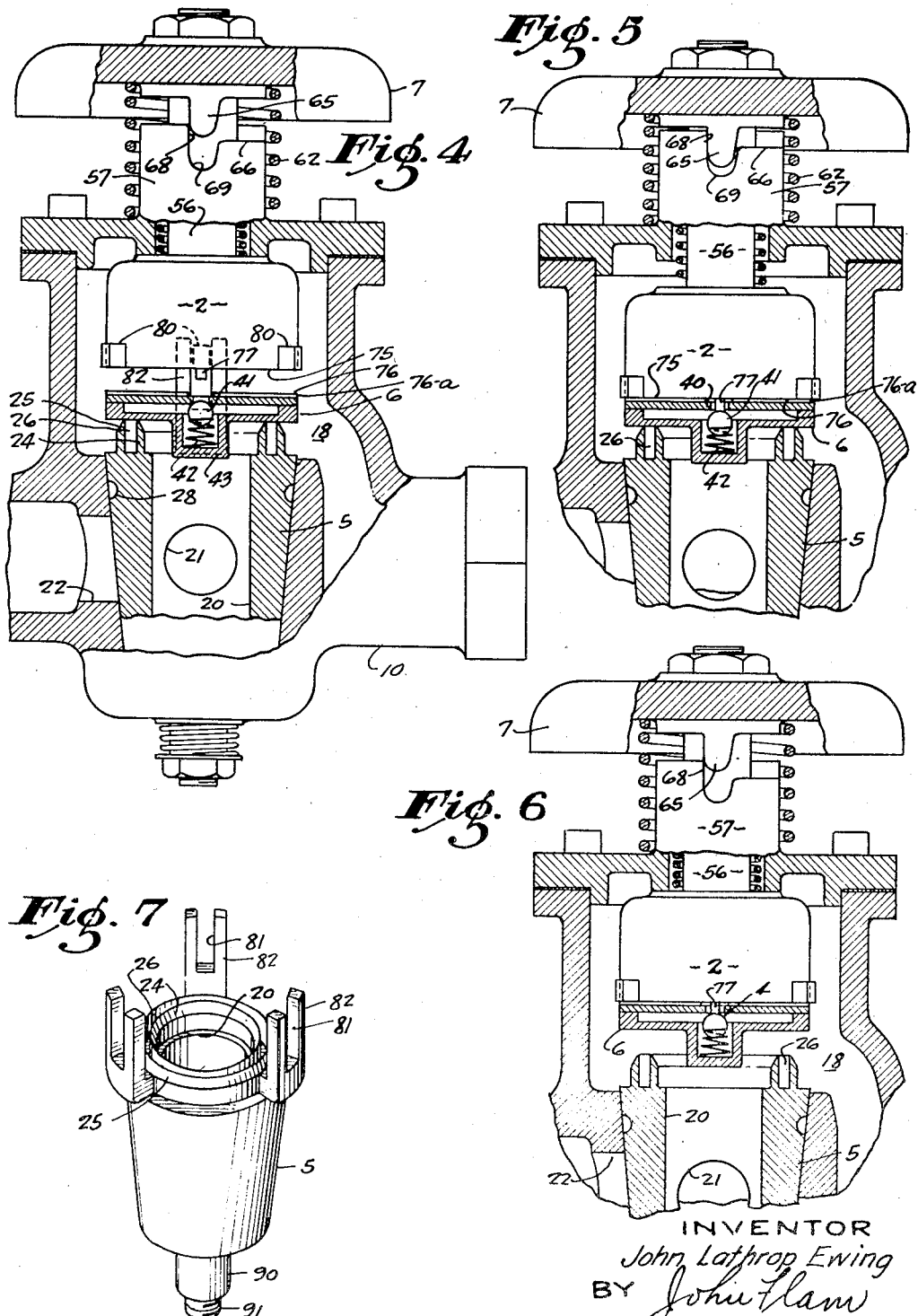

Patented Feb. 20, 1951

2,542,127

UNITED STATES PATENT OFFICE 2,542,127

RESET VALVE

John Lathrop Ewing, San Marino, Calif., assignor to General Controls Co., Glendale, Calif., a corporation of California Application July 31, 1944, Serial No. 547,383

11 Claims. (Cl. 137—144)

This invention relates to an electromagnetic reset valve for fluid fuels.

Such valves are used in fuel supply systems to control the flow of fuel to the burner, and to prevent such flow of fuel unless a pilot flame is burning. A valve structure of this character usually comprises a pair of valves, both of which must be open to permit passage of fuel through the valve structure. One of these valves forming a safety valve is arranged to be maintained open by an electromagnet energized by a thermocouple heated by the pilot flame. The other, or main, valve is manually operable to regulate the passage of fuel to the main burner. Thus, the latter valve may be opened or closed as desired, the pilot flame serving to ignite the fuel passing through the burner whenever this valve is open.

If the pilot flame is extinguished, the safety valve closes, thus preventing passage of fuel through the main valve. To re-establish the fuel supply, the safety valve must be manually returned to open position or reset, and held in such position until the pilot flame is lighted, after which this valve may be released, the electromagnet serving to retain it in open position. If, however, the flame fails to light for any reason, release of the safety valve permits the valve to close again, and the resetting operation must be repeated. Manual resetting of this character is required, because the electromagnet, when energized, is incapable of attracting the safety valve closure to open position. However, if the safety valve closure is manually moved to open position, the electromagnet has enough force to maintain the valve in open position.

It is an object of this invention to provide such a valve structure of compact and simplified construction and having an improved mode of operation.

It is another object of this invention to provide a reset valve wherein the safety valve closure operates in a downward direction to close, and in which the operating handle for the valve is on top of the valve body.

It is another object of this invention to provide a reset valve having a supplemental or pilot valve for initially controlling the flow of fuel to the pilot burner.

It is another object of this invention to provide a reset valve wherein the operating handle for the main valve serves, upon optional movement in a direction transverse to its direction of movement for operating the main valve, to open the pilot valve.

It is another object of this invention to provide a reset valve wherein the main valve closure is rotatable to open and close the valve, and wherein the electromagnet that controls the safety valve closure is rotatable for operating the main valve closure.

It is another object of this invention to provide a reset valve wherein the main valve closure, the safety valve closure, and the electromagnet which co-operates with the safety valve closure comprise a rotatable unit.

It is another object of this invention to provide a reset valve having a pilot valve adapted to be closed by spring means, as well as a safety valve closure in which the spring acts to assist the closing movement of the safety valve closure.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

In the drawings:

Figure 1 is a longitudinal section through a valve incorporating the invention;

Fig. 1a is an elevation of the upper end of the valve as seen from the right in Fig. 1;

Figs. 2 and 3 are sections taken on the correspondingly numbered planes of Fig. 1;

Figs. 4, 5 and 6 are fragmentary views similar to Fig. 1, but showing different operating positions of the valve; and Fig. 7 is a pictorial view of the main valve closure member.

This valve is of the type for controlling the fluid fuel supply to a burner which is operated at regular intervals, a constantly burning pilot flame being provided for igniting the main burner after periods of inactivity.

The valve structure comprises a main valve 3 which is manually operable for optionally controlling the supply of fuel to a main burner (not shown). Obviously it is important to provide means whereby, upon extinguishment of the main burner and of the pilot burner, the supply of fuel to these burners is interrupted. Further, means must be provided for preventing re-establishment of the supply to the main burner until the pilot burner has been relighted. For this purpose, a safety valve 1 is provided controlling the flow of fuel through the valve and is adapted to be retained in open position by an electromagnet 2, energized in response to electricity generated by the heat of the pilot burner flame in a well-known manner, as by a thermocouple (not shown). Upon the extinguishment of the pilot burner for any reason, electromagnet 2 is de-energized, permitting valve 1 to close, and stopping all fuel supply to the burners. To avoid a dangerous condition when the valve 1 is reopened, the means for opening valve 1 is so arranged that main valve 3 must be closed before the valve 1 can be opened. Further, before both valves 1 and 3 can be maintained in open position, the pilot burner must be lighted to energize magnet 2 to retain valve 1 in open position. Furthermore, to facilitate lighting of the pilot burner, a supplemental valve 4 is provided for initially controlling the fuel supply thereto.

In the present instance, the main valve 3 includes a rotatable closure member, or plug 5, while the safety valve 1 includes a closure member 6 movable axially of the main valve closure. For operating these closure members, use is made of an electromagnet assembly 2, mounted for rotary and axial movement in response to movement of the operating handle 7. Thus the magnet 2 when energized in response to the heat of the pilot flame serves to maintain the safety closure 6 in open position above its seat. It is however incapable of attracting the closure 6 unless the magnet be lowered into contact with the closure.

Magnet 2 is coupled to main valve closure 5 so that rotation of magnet 2 by handle 7 serves to rotate closure 5 to control the passage of fuel. Upon de-energization of magnet 2 as by the extinguishment of the pilot flame, safety closure 6 is released and drops to its seat by gravity, shutting off the flow of fuel through the valve. When it is desired to relight the pilot burner, magnet assembly 2 is moved axially downwards by means of handle 7 to engage safety closure 6. The supplemental valve 4 is arranged to be opened by movement of magnet 2 into engagement with member 6, hence the supply of fuel to the pilot burner is re-established and the pilot may be lighted. After a brief interval the magnet 2 again becomes energized so that upward movement of the magnet lifts closure 6 to its open position and control of the main fuel supply is restored to main valve 3, and the valve is reset. Appropriate means are provided to prevent opening of the supplemental valve 4 until main valve closure 5 is in closed position, as will be presently described.

Referring to Figs. 1, 2 and 3, the valve structure comprises an elongated body 10 having axially aligned threaded openings 11 and 12 for connection to suitable conduits and forming, respectively, the inlet and the outlet. Between openings 11 and 12, a boss 13 extends transversely of the body 10 and provides a seat 14 for the main closure member 5, which comprises a tapered rotary plug. Extending above boss 13 and coaxial therewith is a cylindrical extension 16 of the body 10 closed at its upper end as by a detachable cover 17 and providing a space 18 continuously in communication with inlet 11 by means of opening 19. Electromagnet 2 is accommodated in space 18.

To establish communication between the space 18 and the outlet 12 and hence permit flow of fluid through body 10, the plug 5 has an axial port 20 opening at the top of the plug and adapted to communicate with the space 18. Axial port 20 is intersected by a radial port 21 adapted to communicate with the outlet 12 through an opening 22 in boss 13. Rotation of plug 5 in its seat 14 serves to place port 21 into and out of registry with opening 22 as desired.

Main valve closure 5 is provided at its upper end with a pair of spaced annular valve seats 24 and 25 surrounding the main port 20 and which provide a space 26 between them and on top of the plug 5. Main port 20 opens into the space within the innermost valve seat 24, while a supplemental port 27 for supplying fuel to the pilot burner is formed in plug 5 and leads from the space 26 to a groove 28 formed on the exterior of the plug. Groove 28 communicates with a conduit 29 (Fig. 2) leading to the pilot burner by means of a supplemental outlet 30 formed in body 10. In this way, the pilot burner is in communication with the space 26 between valve seats 24 and 25 at all times.

The safety valve closure 6 is in the form of a disc of magnetic material arranged to seat in response to gravity on both valve seats 24 and 25 and prevent flow of fuel to the main port 20 as well as to the supplemental port 27. Thus no fluid can pass from inlet 11 to outlet 12 regardless of the registry of ports 21 and 22. However, in order to supply fuel to the pilot burner so that magnet 2 may be energized to permit opening of the safety valve 1, the supplemental valve 4 is provided in closure 6 for operation when it is desired to light the pilot preparatory to a resetting operation.

For this purpose, the closure member 6 is hollow; the lower member 33 is provided with a raised edge 34 to which is secured a disc-like upper member 35 as by screws 36, thus defining a space or chamber 37 between the members. Chamber 37 is in continuous communication with space 26 between valve seats 24 and 25 by one or more openings 38 through the lower member 33. The upper member 35 has a central port or opening 40 providing a valve seat 40—a and adapted to be controlled by a closure member 41 which may conveniently be a steel ball; this comprises the supplemental or pilot valve 4. A light compression spring 42 accommodated in a well 43 in lower member 33, serves to urge closure 41 toward its seat. With closure 6 seated, opening of the supplemental valve 4 will supply fuel to the pilot burner from inlet 11 without permitting any fuel to pass to the main outlet 12; if closure 6 is unseated, fuel can pass directly from inlet 11 to the space 26 and port 27 without passing valve 4. Further fluid can enter freely the main port 20 so as to pass to the outlet 12 in accordance with the relative positions of port 21 and opening 22.

The electromagnet assembly 2 is movably mounted and arranged to operate the valves 1, 3 and 4 in accordance with its movements and dependent on its energization. Thus the magnet 2 comprises an inverted cylindrical cup 47 surrounding a central core 48 and forming an annular space 49 for the reception of a coil 50. Coil 50 is connected by leads 51 and 52 to conventional binding posts 53 and 54 mounted in the cylindrical body extension 16 and appropriately insulated therefrom (see Fig. 3). These binding posts are connected by leads (not shown) to a thermocouple arranged to be heated by the pilot flame. When the pilot flame is burning magnet 2 is energized; when the flame is extinguished, the magnet is de-energized.

Cup 47 and core 48 are shown as formed integrally with the stem or part 56 which is supported for rotary as well as axial movement by a boss 57 on cover 17. The operating handle 7 is secured on the upper end portion 58 of reduced diameter of stem 56 by a key 59 and nut 60 threaded on the stem. A compression spring 62 interposed between the handle 7 and cover 17 urges the magnet assembly 2 upwardly, a shoulder 63 on cup 47 serving by engagement with an extension 64 of boss 57 to limit this upward movement. To prevent the handle 7 and the magnet assembly 2 being depressed except when they are in a predetermined angular position, handle 7 is provided with a pair of depending teeth or dogs 65, which are arranged to move over arcuate surfaces 66 on the upper end of boss 57, suitable clearance being provided. Surfaces 66 are of limited angular extent and are provided at each end with elevated portions or stops 67 and 68. Stops 67 and 68 are angularly spaced with regard to the angular extent of teeth 65 to limit the angular movement of the magnet assembly 2 to approximately 90°. Furthermore, each surface 66 adjacent a corresponding one of the stops has a recess 69 for accommodating the corresponding tooth 65 and allow the magnet assembly 2 to be depressed upon appropriate angular positioning of handle 7 and plug 5 as indicated in Fig. 5. The amount of such downward movement is sufficient to bring the face 75 of the magnet assembly 2 into contact with the upper face 76 of the safety valve closure 6. The face 75 has a projection or pin 77 adapted to enter port 40 and engage closure 41 as face 75 approaches face 76. Thus when these faces are in contact, pin 77 unseats closure 41 so that the supplemental valve 4 is opened. To insure adequate fuel supply to valve 4 when faces 75 and 76 are in contact, one of the faces, as 76, is provided with a plurality of shallow grooves 76—a extending from port 40 to the periphery of the closure member 6.

In order to transmit rotary movement from the operating handle 7 to plug 5, magnet cup 47 is provided with a plurality of peripheral angularly spaced lugs 80 which engage respectively slots 81 provided by forks 82 formed on plug 5 (Fig. 7). Thus the magnet assembly 2 and plug 5 are secured for rotational movement together, but the magnet 2 is axially movable with respect to the plug 5 when a definite angular position is reached.

The forks 82 serve additionally as guides for the safety closure 6. The closure member 6 is freely slidable within the space defined by the forks 82; at the same time lateral movement of member 6 is so restricted that the passage or passages 38 can never extend beyond seats 24 or 25 and permit an undesired flow of fuel to the pilot port 27 or to the main port 20.

To prevent leakage past stem 56, boss 57 has a recess 85 in the upper end of which is a packing ring 86, retained in position and urged into sealing relation with the wall of the recess 85 and stem 56 by a compression spring 87 supported on shoulder 63 of magnet cup 47.

As a means of retaining plug 5 in sealing relation with its seat 14, the lower, small end of the plug 5 has cylindrical extension 90 of reduced diameter with a threaded end 91. A nut 92 and washer 93 secured on the threaded end 91 serve to compress a light spring 94 against a shoulder 95 on body 10. The force of spring 94 urges plug 5 downwardly against the taper of its seat 14.

The operation of the valve will be readily understood from a study of Figs. 1, 4, 5 and 6 which illustrate successive steps in the operation of resetting the valve. In Fig. 1, all parts are shown in the relative positions they would occupy after flame failure, or possibly in initially starting operation of a system incorporating the valve. Thus the main valve 3 is fully open, port 21 being aligned with passage 22. However, no fuel can pass valve 3, since safety closure 6 is seated, closing port 20. Further, no fuel can flow to the pilot burner since safety closure 6 also prevents passage of fuel to space 26 and port 27, and the supplemental valve 4 is also closed.

To place the system in operation, handle 7 is turned to bring lugs 65 against stops 68, which aligns lugs 65 with recesses 69 and by means of the connection provided by lugs 80 and forks 82 between the magnet assembly 2 and plug 5, rotates the plug so that port 21 does not communicate with opening 22. All parts are now in the relative positions of Fig. 4, and no fuel can flow.

The handle 7 is next depressed against the force of spring 62, dogs 65 entering recesses 69, and face 75 of magnet assembly 2 contacting face 76 of the safety closure 6. Pin 77 also unseats valve closure 41 allowing fuel to pass to the pilot burner via passages 76—a, chamber 37, ports 38 and space 26. All parts are now in the position of Fig. 5 and the pilot burner may be lighted. After a brief interval sufficient to permit the thermocouple to become active and energize magnet 2, handle 7 is released and returned to its upper position by spring 62. Due to the attraction of magnet 2 for closure 6, the closure is carried up off its seats 24 and 25 as the magnet moves up, opening main port 20, as well as the space 26 between seats 24 and 25 to inlet 11. Thus the pilot burner is supplied with fuel without the fuel passing through valve 4 and fuel may be supplied to the main burner by rotating plug 5 to bring port 21 into registry with opening 22. All parts are now in the relative positions of Fig. 6. The plug 5 is rotated by means of handle 7 which can now be turned since its upward movement has lifted dogs 65 clear of recesses 69. The plug can now be turned from off to a fully open position or to some intermediate position and vice versa to control, extinguish or light the main burner as desired.

If the pilot burner fails to ignite for any reason, or sufficient time for the thermocouple to become active to energize magnet 2 has not elapsed before handle 7 is released, closure member 6 will remain in closed position when the magnet assembly 2 moves up. Such movement will also allow the pilot valve closure 41 to seat, and the proceeding must be started again.

With the safety closure 6 unseated and suspended from the magnet assembly 2 as shown in Fig. 6, and regardless of the position of plug 5, whenever flame failure occurs, magnet 2 is de-energized and releases closure member 6 which drops to its seats 24, 25 by gravity, the position of Fig. 1. The spring 42 assists in releasing closure 6 from magnet 2 since it urges closure 41 upwardly against the pin 77. The arcuate surfaces 66 cooperate with dogs 65 to prevent depression of handle 7, and hence opening of the pilot valve 4, except when the main valve 3 is closed.

The inventor claims:

1. In a reset valve for fluid fuels, a valve body, a rotatable closure member for controlling the flow of fuel through said body and having an axial port opening upwardly, an electro-magnet mounted in said body above the rotatable closure member for rotary as well as axial movement, an axially movable safety closure member co-operating with said axial port, said safety closure member being disposed between the rotatable member and the magnet for operation by the magnet, and means for transmitting rotary motion between the rotatable member and the magnet.

2. In a reset valve for fluid fuels, a valve body, a rotary plug for controlling the flow of fuel through the body and having an axially extending port opening at the top of the plug, means forming a supplemental port in the plug also opening at the top of the plug and continuously communicating with a supplemental outlet, a safety closure member adapted to simultaneously control passage of fuel through both of said ports, and means forming a supplemental valve carried by said closure member for optionally admitting fuel to the supplemental port.

3. In a reset valve for fluid fuels, a valve body, a rotary plug for controlling the flow of fuel through the body and having an axially extending port opening at the top of the plug, means forming a supplemental port in the plug also opening at the top of the plug and continuously communicating with a supplemental outlet, a safety closure member adapted simultaneously to control passage of fuel through both of said ports, means forming a passage in said safety closure member adapted to admit fuel to the said supplemental port, a supplemental valve carried by said member for controlling said passage, and means resiliently urging said supplemental valve to close.

4. In a reset valve for fluid fuels, a valve body, a rotary plug for controlling the flow of fuel through the body and having an axially extending port opening at the top of the plug, a pair of spaced annular valve seats surrounding the port opening, a supplemental port in the plug continuously connecting the space between the seats with a supplemental outlet, a safety closure member adapted to cooperate with said valve seats for controlling passage of fuel to both said ports, an electro-magnet mounted for rotary and axial movement and coupled to the plug for imparting rotation thereto, means forming a passage in said member adapted to admit fuel to the space between the seats, a supplemental valve carried by said member for controlling said passage, said electro-magnet being arranged to engage said member upon axial movement in one direction, and means whereby said magnet when in engagement with said member maintains said supplemental valve open, said electro-magnet upon axial movement in the opposite direction serving, where energized, to unseat the member and open both ports.

5. In a reset valve for fluid fuels, a valve body, a rotary plug for controlling the flow of fuel through the body and having an axially extending port opening at the top of the plug, a pair of spaced annular valve seats surrounding the port opening, a supplemental port in the plug continuously connecting the space between the seats with a supplemental outlet, a safety closure member adapted to cooperate with said valve seats for controlling passage of fuel to both said ports, an electro-magnet mounted for rotary and axial movement and coupled to the plug for imparting rotation thereto, means forming a passage in said member adapted to admit fuel to the space between the seats, a supplemental valve carried by said member for controlling said passage, means exerting a resilient force urging said supplemental valve to close, said magnet being adapted to engage said member upon axial movement in one direction, means whereby said magnet when in engagement with said member maintains the supplemental valve open against said resilient force, energization of said magnet serving to maintain the member in engagement with the magnet upon movement of the magnet in the opposite direction, whereby said member is unseated and opens both ports, said force continuously urging the member away from the magnet, whereby to assist closing movement of the member upon de-energization of the magnet.

6. In a reset valve for fluid fuels: a valve body having an inlet and an outlet; a main closure comprising a rotatable plug having an axially extending port opening upwardly; a safety closure, composed at least partly of magnetic material, for said port movable axially of the plug, either of said closures in closed position preventing fuel flow through said outlet; an electromagnet mounted for rotary and axial movement in said body, and coupled with the plug in a manner preventing angular movement between the plug and the magnet but allowing free relative axial movement between the plug and the magnet; means for energizing the magnet; and means for moving said magnet angularly to operate said plug, as well as axially, to cause the magnet when energized, to operate the safety closure.

7. In a reset valve for fluid fuels: a valve body having an inlet and an outlet; a main closure comprising a rotatable plug having an axially extending port opening upwardly; a safety closure, composed at least partly of magnetic material, for said port movable axially of the plug, either of said closures in closed position preventing fuel flow through said outlet; an electromagnet mounted for rotary and axial movement in said body; means coupling said magnet and said plug to prevent relative angular movement between the plug and the magnet, but to permit relative axial movement between the plug and the magnet, comprising a plurality of upwardly extending members about the periphery of the plug and engaging the magnet, said members confining the safety closure to move axially of the plug; means for energizing the magnet; and means for moving said magnet angularly to operate said plug, as well as axially, to cause the magnet when energized, to operate the safety closure.

8. In a reset valve for fluid fuels: a valve body having an inlet, as well as a main and a supplemental outlet; a main closure in said body and movable to various positions to control fluid flow between said inlet and main outlet; means forming a safety valve seat within said body in series with said main closure and with said inlet and main outlet; means forming a supplemental port adjacent said safety valve seat continously communicating with said supplemental outlet; a safety closure movable to simultaneously control passage of fuel through said safety valve seat and said supplemental port; means forming a passage in said safety closure communicating with said supplemental port when the safety closure is in port closing position and having an opening communicable with said inlet; a supplemental valve structure carried by said safety closure for controlling the flow of fuel in said passage when said safety closure is in closed position, including a valve seat and a cooperating closure engageable with said seat; and means for operating said closures; said operating means and all of said closures being disposed in substantially coaxial relation.

9. In a reset valve for fluid fuels: a valve body having an inlet, as well as a main and a supplemental outlet; a main closure in said body and movable to various positions to control fluid flow between said inlet and main outlet; means forming a safety valve seat within said body in series with said main closure and with said inlet and main outlet; means forming a supplemental port adjacent said safety valve seat continuously communicating with said supplemental outlet; a safety closure movable simultaneously to control passage of fuel through said safety valve seat and said supplemental port; means forming a passage in said safety closure communicating with said supplemental port when the safety closure is in port closing position and having an opening communicable with said inlet; a supplemental valve structure carried by said safety closure for controlling the flow of fuel in said passage when said safety closure is in closed position, including a valve seat and a cooperating closure engageable with said seat; and common means, movable both axially and rotationally, for operating all of said closures.

10. In a reset valve for fluid fuels: a valve body having an inlet as well as a main and a supplemental outlet; a main closure optionally operable to prevent fluid flow through said main outlet; means forming a safety valve seat within said body in series with said main closure and with said inlet and main outlet; means forming a supplemental port adjacent said safety valve seat continuously communicating with said supplemental outlet; a safety closure movable to simultaneously control passage of fuel through said safety valve seat and said supplemental port; means forming a passage in said safety closure communicating with said supplemental port when said safety closure is in closed position, said passage having an opening communicable with said inlet; a supplemental valve carried by said safety closure for controlling the flow of fuel in said passage when said safety closure is in closed position; means for shifting said safety closure to open position; an operator for said supplemental valve carried by said shifting means; a common manual actuator for said main valve and said shifting means; and means preventing operation of said actuator to open said safety closure and said supplemental valve unless said main closure is in closed position.

11. In a reset valve for fluid fuels: a valve body having an inlet as well as a main and supplemental outlet: a main closure optionally operable to prevent fluid flow through said main outlet; means forming a safety valve seat within said body in series with said main closure and with said inlet and main outlet; means forming a supplemental port adjacent said safety valve seat continuously communicating with said supplemental outlet; a safety closure movable to simultaneously control passage of fuel through said safety valve seat and said supplemental port; means forming a passage in said safety closure communicating with said supplemental port when said safety closure is in closed position, said passage having an opening communicable with said inlet; a supplemental valve carried by said safety closure for controlling the flow of fuel in said passage when said safety closure is in closed position; means for shifting said safety closure to open position; an operator for said supplemental valve carried by said shifting means; a common manual actuator for said main valve and said shifting means; said actuator being movable in one direction to control said main closure and movable in another direction transverse to said one direction to operate said shifting means and said supplemental valve operator; and means preventing transverse movement of said actuator unless said main closure is in closed position.

JOHN LATHROP EWING.

REFERENCES CITED

The following references are of record in the file of this patent:

UNITED STATES PATENTS

| Number | Name | Date |
|---|---|---|
| 1,387,073 | Reilley | Aug. 9, 1921 |
| 2,271,506 | Mantz | Jan. 27, 1942 |
| 2,309,709 | Paille | Feb. 2, 1943 |
| 2,313,890 | Ray | Mar. 16, 1943 |
| 2,318,823 | Wantz | May 11, 1943 |
| 2,353,759 | Ray | July 18, 1944 |
| 2,372,537 | Wantz | Mar. 27, 1945 |
| 2,402,732 | Cohen | June 25, 1946 |
| 2,403,611 | Ray | July 9, 1946 |
| 2,422,368 | Ray | June 17, 1947 |